United States Patent
Nagai et al.

(10) Patent No.: US 11,377,545 B2
(45) Date of Patent: Jul. 5, 2022

(54) CURABLE RESIN COMPOSITION, CURED PRODUCT, DIFFRACTIVE OPTICAL ELEMENT, MULTILAYER DIFFRACTIVE OPTICAL ELEMENT, AND METHOD FOR PRODUCING CURABLE RESIN COMPOSITION

(71) Applicant: FUJIFILM Corporation, Tokyo (JP)

(72) Inventors: Takayasu Nagai, Ashigarakami-gun (JP); Naozumi Shiraiwa, Ashigarakami-gun (JP); Takafumi Nakayama, Ashigarakami-gun (JP); Naoyuki Morooka, Ashigarakami-gun (JP); Masahiro Takata, Ashigarakami-gun (JP); Masanori Fujiwara, Ashigarakami-gun (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 17/020,305

(22) Filed: Sep. 14, 2020

(65) Prior Publication Data

US 2020/0407546 A1    Dec. 31, 2020

Related U.S. Application Data

(63) Continuation of application No. PCT/JP2019/010442, filed on Mar. 14, 2019.

(30) Foreign Application Priority Data

Mar. 15, 2018    (JP) .............................. JP2018-047770

(51) Int. Cl.
| | |
|---|---|
| *C08F 2/46* | (2006.01) |
| *C08F 2/50* | (2006.01) |
| *C08G 61/04* | (2006.01) |
| *C08L 33/10* | (2006.01) |
| *C08F 20/12* | (2006.01) |
| *C08F 20/38* | (2006.01) |
| *C08K 3/22* | (2006.01) |
| *C08K 9/04* | (2006.01) |
| *C08L 33/02* | (2006.01) |
| *G02B 1/04* | (2006.01) |
| *G02B 1/12* | (2006.01) |
| *B82Y 30/00* | (2011.01) |

(52) U.S. Cl.
CPC .............. *C08L 33/10* (2013.01); *C08F 2/50* (2013.01); *C08F 20/12* (2013.01); *C08F 20/38* (2013.01); *C08K 3/22* (2013.01); *C08K 9/04* (2013.01); *C08L 33/02* (2013.01); *G02B 1/04* (2013.01); *G02B 1/12* (2013.01); *B82Y 30/00* (2013.01)

(58) Field of Classification Search
CPC .......... C08L 33/22; C08L 33/10; C08L 33/02; C08K 9/04; C08K 3/22; B82Y 30/00; C08F 20/12; C08F 20/38; C08F 2/50; G02B 5/1876; G02B 5/1847; G02B 1/043; G02B 1/04; G02B 1/12
USPC ...................... 522/6, 189, 184, 71, 1; 520/1
See application file for complete search history.

(56) References Cited

U.S. PATENT DOCUMENTS

| | | |
|---|---|---|
| 2013/0237630 A1 | 9/2013 | Morooka et al. |
| 2016/0116653 A1 | 4/2016 | Murayama et al. |
| 2020/0392379 A1* | 12/2020 | Nakamura ................. C09J 7/29 |

FOREIGN PATENT DOCUMENTS

| | | | |
|---|---|---|---|
| JP | 2006-220689 A | | 8/2006 |
| JP | 2006-290999 | * | 10/2006 |
| JP | 2006-290999 A | | 10/2006 |
| JP | 2008-241734 A | | 10/2008 |
| JP | 2008-308593 | * | 12/2008 |
| JP | 2008-308593 A | | 12/2008 |
| JP | 2012-107191 A | | 6/2012 |
| JP | 2013-216740 A | | 10/2013 |
| WO | 2010/055845 A1 | | 5/2010 |
| WO | 2015/002185 A1 | | 1/2015 |
| WO | 2018/097279 A1 | | 5/2018 |

OTHER PUBLICATIONS

Mori et al, JP 2006-290999 Machine Translation, Oct. 26, 2006 (Year: 2006).*
Hirota et al, JP 2008-308593 Machine Translation, Dec. 25, 2008 (Year: 2008).*
Jansons et al., "Continuous Growth of Metal Oxide Nanocrystals: Enhanced Control of Nanocrystal Size and Radial Dopant Distribution", ACS NANO, 2016, vol. 10, pp. 6942-6951.
International Search Report dated Jun. 11, 2019, issued by the International Searching Authority in application No. PCT/JP2019/010442.
Written Opinion dated Jun. 11, 2019, issued by the International Searching Authority in application No. PCT/JP2019/010442.

(Continued)

*Primary Examiner* — Jessica Whiteley
(74) *Attorney, Agent, or Firm* — Sughrue Mion, PLLC

(57) ABSTRACT

The present invention provides a curable resin composition including a bifunctional or more (meth)acrylate compound, indium tin oxide particles, and an acidic polymer, in which the acidic polymer has a moiety including a carboxyl group at a polymer skeleton of a (meth)acrylate compound and at any one of terminals of the polymer skeleton of a (meth)acrylate compound, and an acid value of the acidic polymer is 2.0 mgKOH/g or more and less than 100 mgKOH/g. The curable resin composition of the present invention provides a transparent cured product, hardly causes bubbles to be mixed in a case of applying the curable resin composition to a mold so as to form a lattice-shaped cured product, and also has a good peeled surface shape from the mold after curing. The present invention also provides a diffractive optical element including a surface having a diffraction grating shape and formed of the cured product of the curable resin composition.

19 Claims, 2 Drawing Sheets

(56) References Cited

OTHER PUBLICATIONS

International Preliminary Report on Patentability dated Sep. 15, 2020, issued by the International Bureau in application No. PCT/JP2019/010442.

Office Action dated Aug. 31, 2021 from the Japanese Patent Office in JP Application No. 2020-506635.

Office Action dated Mar. 15, 2022 from the Japanese Patent Office in JP Application No. 2020-506635.

* cited by examiner

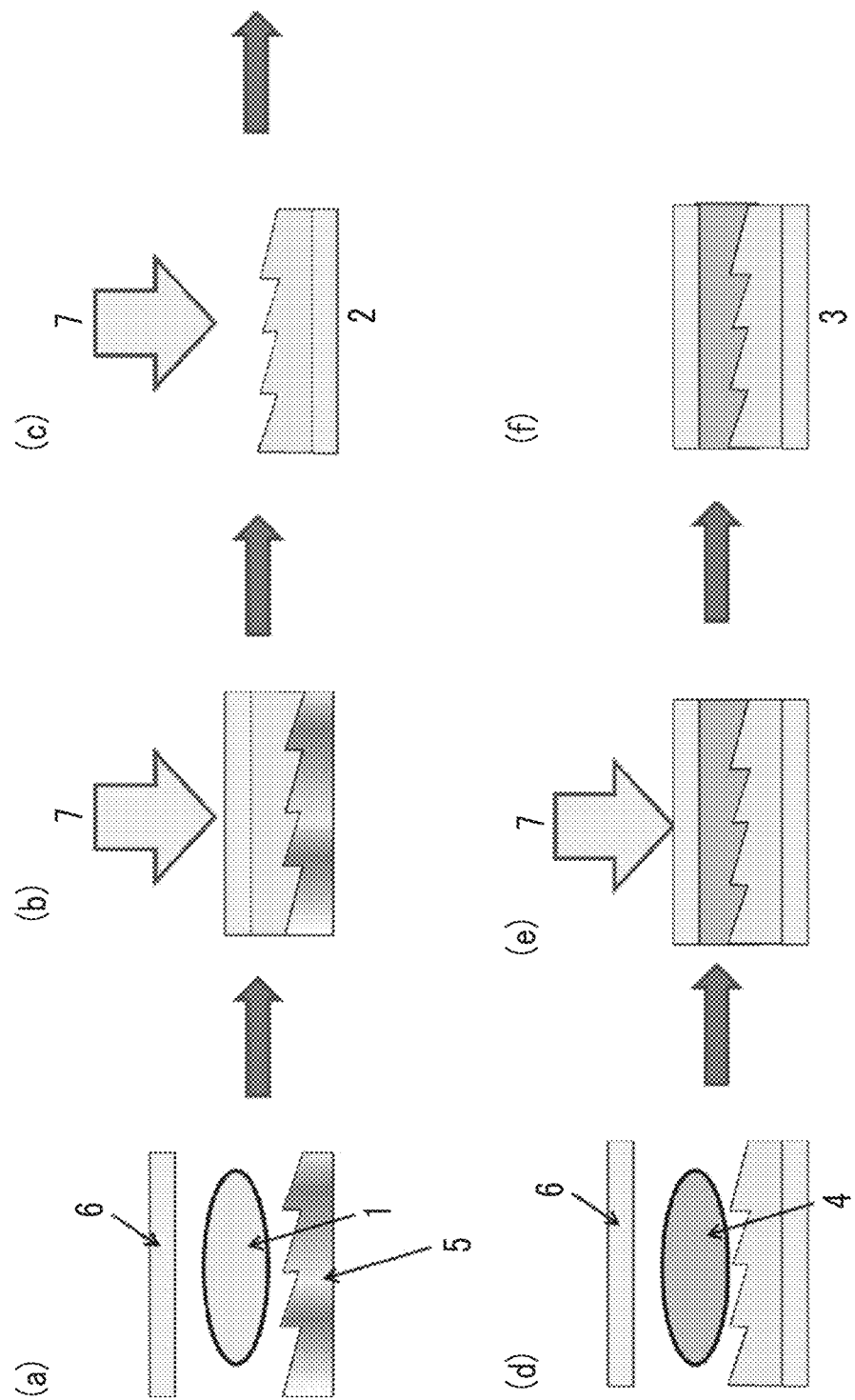

CURABLE RESIN COMPOSITION, CURED PRODUCT, DIFFRACTIVE OPTICAL ELEMENT, MULTILAYER DIFFRACTIVE OPTICAL ELEMENT, AND METHOD FOR PRODUCING CURABLE RESIN COMPOSITION

CROSS-REFERENCE TO RELATED APPLICATIONS

This application is a continuation of PCT International Application No. PCT/JP2019/010442 filed on Mar. 14, 2019, which claims priority under 35 U.S.C. § 119 (a) to Japanese Patent Application No. 2018-047770 filed on Mar. 15, 2018, the entire content of which is incorporated herein by reference.

BACKGROUND OF THE INVENTION

1. Field of the Invention

The present invention relates to a curable resin composition. The present invention particularly relates to a curable resin composition including ITO particles. The present invention also relates to a cured product obtained using the curable resin composition, and a diffractive optical element. The present invention further relates to a method for producing the curable resin composition.

2. Description of the Related Art

By using a diffractive optical element, it is possible to obtain a lens which has a shorter focal length as the wavelength is longer, and exhibits chromatic aberration opposite to that of a refractive lens in the related art. Unlike the refractive lens requiring a plurality of lenses for correcting chromatic aberration, chromatic aberration can be corrected by changing the period of a diffraction structure of a lens, therefore a more compact and high-performance lens unit can be designed by using the diffractive optical element.

In a multilayer diffractive optical element having a structure in which diffractive optical elements formed of two different materials are in contact with each other on lattice planes thereof, by forming one diffractive optical element with a material having a relatively high refractive index and high Abbe number, and forming the other diffractive optical element with a material having a relatively low refractive index and low Abbe number, it is possible to suppress the occurrence of flare in the lens, and the like, and sufficiently utilize a chromatic aberration reducing effect. In this case, in a case where the two diffractive optical elements have optical characteristics in which the difference in refractive index between the two diffractive optical elements is larger at a longer wavelength, the chromatic aberration reducing effect can be obtained in a wide wavelength range.

In recent years, in order to obtain, as described above, the chromatic aberration reducing effect in a wide wavelength range, it has been proposed to add indium tin oxide (ITO) particles to a curable resin composition which is used as a material for producing a low Abbe number diffractive optical element in the multilayer diffractive optical element. For example, JP2006-220689A discloses, as a curable resin composition for producing a diffractive optical element, a curable resin composition in which ITO fine particles are dispersed in a resin containing a photopolymerization initiator, a dispersant, and a mixture of two or more acryloyl groups, methacryloyl groups, or vinyl groups, or unsaturated ethylene groups thereof.

On the other hand, JP2008-308593A discloses, as a coating composition including a metal oxide, which has good dispersibility and temporal stability, and is excellent in transparency and coating film resistance in a case of being formed into a coating film, a composition including a dispersion resin. The dispersion resin includes an ethylenically unsaturated double bond, and includes at least one polar group selected from —COOM, —SO$_3$M, —PO(OM)$_2$ (M represents a hydrogen atom, a quaternary amine, or an alkali metal), —OH, —NR$_n$ (R represents a hydrocarbon group and n represents an integer of 2 or 3), and a sulfobetaine group.

SUMMARY OF THE INVENTION

An object of the present invention is to provide a curable resin composition suitable for producing a diffractive optical element. More specifically, an object of the present invention is to provide a curable resin composition including ITO particles, which provides a transparent cured product, hardly causes bubbles to be mixed in a case of applying the curable resin composition to a mold so as to form a lattice-shaped cured product, and also has a good peeled surface shape from the mold after curing.

In the process of study for achieving the above object, the present inventors have attempted to produce an optical element using the curable resin composition described in JP2006-220689A or JP2008-308593A, and in any case, it has been found that, in a case of applying the curable resin composition to a mold so as to form a diffractive optical element having a diffraction grating shape, a gap (bubble) is mixed in a corner of a level difference. As a result of studies by the present inventors, the reason is considered that any of the curable resin composition has a high viscosity. As a result of further repeated studies, the present inventors have attempted to control the viscosity by a structure of a dispersant to be added in addition to a monomer and ITO fine particles, thereby leading to the achievement of the above object.

That is, the present invention provides the following <1> to <20>.

<1> A curable resin composition comprising:
a bifunctional or more (meth)acrylate compound;
indium tin oxide particles; and
an acidic polymer,
in which the acidic polymer has a moiety including a carboxyl group at a polymer skeleton of a (meth)acrylate compound and at any one of terminals of the polymer skeleton of a (meth)acrylate compound, and
an acid value of the acidic polymer is 2.0 mgKOH/g or more and less than 100 mgKOH/g.

<2> The curable resin composition according to <1>, in which the moiety of the acidic polymer includes the following partial structure.

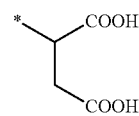

<3> The curable resin composition according to <1> or <2>,
in which the acidic polymer is represented by Formula (1),

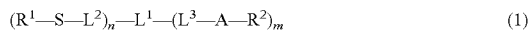

$$(R^1\text{—}S\text{—}L^2)_n\text{—}L^1\text{—}(L^3\text{—}A\text{—}R^2)_m \quad (1)$$

in Formula (1), $R^1$ represents a substituent including at least one carboxyl group, A represents a polymer skeleton of a (meth)acrylate compound, $R^2$ represents a hydrogen atom or a substituent not including a carboxyl group, $L^1$ represents a single bond or a (m+n)-valent linking group, $L^2$ and $L^3$ each independently represent a single bond or a divalent linking group, m represents an integer of 1 to 8, and n represents an integer of 1 to 9, in which m+n satisfies 2 to 6, each of n $R^1$ and $L^2$ may be the same as or different from each other, and each of m $R^2$, A, $L^3$ may be the same as or different from each other.

<4> The curable resin composition according to any one of <1> to <3>, in which a weight-average molecular weight of the acidic polymer is 1,000 to 20,000.

<5> The curable resin composition according to any one of <1> to <4>,
in which a content of the acidic polymer is 5% by mass to 50% by mass with respect to a total mass of the indium tin oxide particles.

<6> The curable resin composition according to any one of <1> to <5>,
in which a content of the indium tin oxide particles is 10% by mass to 60% by mass with respect to a total mass of the curable resin composition.

<7> The curable resin composition according to any one of <1> to <6>,
in which a particle size of the indium tin oxide particle is 5 nm to 50 nm.

<8> The curable resin composition according to any one of <1> to <7>, further comprising:
a photopolymerization initiator.

<9> A method for producing the curable resin composition according to any one of <1> to <8>, the method comprising:
a step of preparing a dispersion liquid in which the indium tin oxide particles are dispersed in a solvent having a constituent (δp) 0 to 6 $\text{MPa}^{1/2}$, the constituent being a polarity term in an SP value;
a step of obtaining a mixed solution by mixing the dispersion liquid with the bifunctional or more (meth)acrylate compound and the acidic polymer; and
a step of distilling off the solvent from the mixed solution.

<10> The producing method according to <9>,
in which the solvent is selected from the group consisting of toluene, xylene, and hexane.

<11> The producing method according to <9>,
in which the solvent is toluene.

<12> The producing method according to any one of <9> to <11>,
in which the indium tin oxide particles in the dispersion liquid are surface-modified with a monocarboxylic acid having 6 to 20 carbon atoms.

<13> The producing method according to <12>,
in which the monocarboxylic acid is oleic acid.

<14> The producing method according to any one of <9> to <13>, further comprising:
a step of further mixing a photopolymerization initiator to a mixture obtained after the distillation.

<15> A cured product of the curable resin composition according to any one of <1> to <8>,
in which a refractive index at a wavelength of 587.56 nm is 1.40 to 1.57, and an Abbe number is 15 to 25.

<16> A diffractive optical element comprising:
the cured product according to <15>,
in which the diffractive optical element includes a surface having a diffraction grating shape and formed of the cured product.

<17> A multilayer diffractive optical element comprising:
a first diffractive optical element; and
a second diffractive optical element,
in which the first diffractive optical element is the diffractive optical element according to <16>, and
the surface of the first diffractive optical element, which has a diffraction grating shape, and a surface of the second diffractive optical element, which has a diffraction grating shape, face each other.

<18> The multilayer diffractive optical element according to <17>, in which a refractive index of the second diffractive optical element at a wavelength of 587.56 nm is 1.55 to 1.70, and is larger than a refractive index of the first diffractive optical element at the wavelength of 587.56 nm, and
an Abbe number of the second diffractive optical element is 35 to 60.

<19> The multilayer diffractive optical element according to <17> or <18>,
in which the surface of the first diffractive optical element, which has a diffraction grating shape, and the surface of the second diffractive optical element, which has a diffraction grating shape, are in contact with each other.

<20> The multilayer diffractive optical element according to any one of <17> to <19>, further comprising:
a transparent substrate,
in which the first diffractive optical element, the second diffractive optical element,
and the transparent substrate are arranged in this order.

According to the present invention, a curable resin composition suitable for producing a diffractive optical element is provided. The curable resin composition according to an aspect of the present invention provides a transparent cured product, hardly causes bubbles to be mixed in a case of applying the curable resin composition to a mold so as to form a lattice-shaped cured product, and also has a good peeled surface shape from the mold after curing.

BRIEF DESCRIPTION OF THE DRAWINGS

FIG. 2 is a diagram showing a producing procedure of a diffractive optical element and multilayer diffractive optical element in Examples.

DESCRIPTION OF THE PREFERRED EMBODIMENTS

Figure 1:
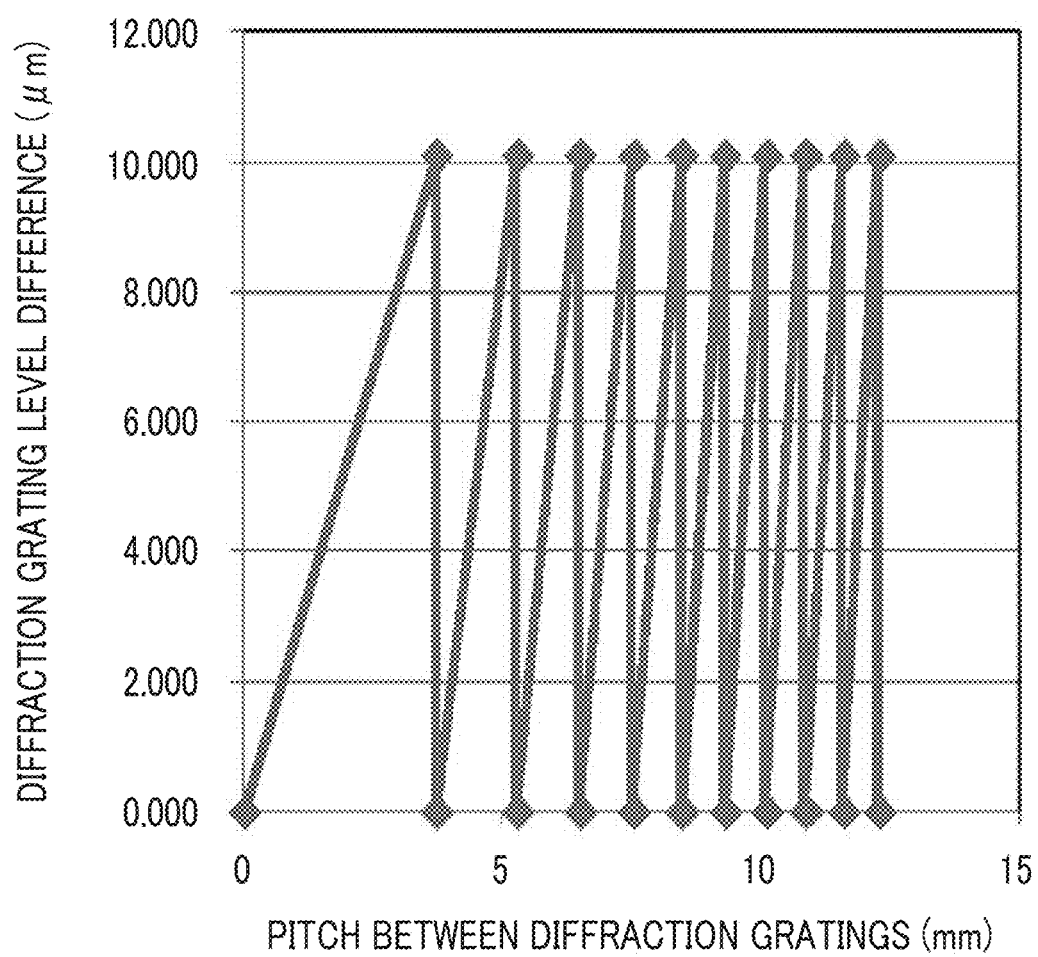
FIG. 1 is a draw showing a level difference and pitch of a diffraction grating shape in a mold used in Examples.

Hereinafter, the present invention will be described in detail. The description of the constitutional requirements described below is made on the basis of representative embodiments and specific examples, but it should not be construed that the present invention is limited thereto. In the present specification, a numerical range represented by using "to" means a range including numerical values described before and after "to" as a lower limit value and an upper limit value.

In the present specification, "(meth)acrylate" represents either one of both of acrylate and methacrylate, and "(meth)acryloyl" represents either one of both of acryloyl and methacryloyl.

<Curable Resin Composition>

The curable resin composition according to an embodiment of the present invention includes a bifunctional or more (meth)acrylate compound, indium tin oxide particles (hereinafter, referred to as "ITO particles"), and an acidic polymer. The curable resin composition according to the embodiment of the present invention may include a component other than the above-described components. Specific examples of the component include a photopolymerization initiator, other monomers, and other additives. The curable resin composition according to the embodiment of the present invention may include a monocarboxylic acid derived from an ITO particle dispersion liquid used as a raw material. In addition, in the curable resin composition according to the embodiment of the present invention, any two or more of the components may be included in a state of being bonded to each other. For example, the ITO particles and the acidic polymer may form a covalent bond.

[Bifunctional or More (Meth)Acrylate Compound]

Since the curable resin composition according to the embodiment of the present invention includes a (meth)acrylate compound as a monomer, it is possible to provide a transparent cured product. In addition, since the curable resin composition according to the embodiment of the present invention includes a bifunctional or more (meth)acrylate compound, it is possible to provide a cured product having high strength and to efficiently perform a curing reaction in a state in which the ITO particles are dispersed. The (meth)acrylate compound is preferably bifunctional. The bifunctional or more (meth)acrylate compound is preferably an aliphatic (meth)acrylate. This is because that a cured product having a lower refractive index can be provided. As the aliphatic (meth)acrylate, a (meth)acrylate compound in which two or more (meth)acryloyloxy groups are bonded to an alkane having 1 to 20 carbon atoms is preferable, a (meth)acrylate compound in which two or more (meth)acryloyloxy groups are bonded to an alkane having 3 to 15 carbon atoms is more preferable, and a (meth)acrylate compound in which two or more (meth)acryloyloxy groups are bonded to an alkane having 5 to 10 carbon atoms is still more preferable. In addition, the above-described alkane is preferably linear, and a di(meth)acrylate compound in which a (meth)acryloyloxy group is bonded to both terminals of a linear alkane is more preferable. Specific examples of the bifunctional or more (meth)acrylate compound include 1,6-hexanediol dimethacrylate (HDDMA), 1,6-hexanediol diacrylate (HDDA), 1,9-nonanediol dimethacrylate (NDDMA), 1,9-nonanediol diacrylate (NDDA), 1,10-decanediol dimethacrylate (DDDMA), and 1,10-decanediol diacrylate (DDDA).

The content of the bifunctional or more (meth)acrylate compound in the curable resin composition according to the embodiment of the present invention is preferably 5% by mass to 80% by mass, more preferably 10% by mass to 70% by mass, and still more preferably 15% by mass to 60% by mass with respect to the total mass of the curable resin composition.

The curable resin composition may contain two or more kinds of bifunctional or more (meth)acrylate compounds. In a case of containing two or more kinds of bifunctional or more (meth)acrylate compounds, the total content is preferably within the above-described range.

[Other Monomers]

The curable resin composition may include a monomer other than the bifunctional or more (meth)acrylate compound. Specifically, the curable resin composition may include a monofunctional (meth)acrylate monomer. Specific examples of the monofunctional (meth)acrylate monomer include the (meth)acrylate monomer described in paragraph 0042 of JP2012-107191A.

[ITO Particles]

By adding indium tin oxide (ITO) particles to the curable resin composition, it is possible to obtain a cured product having a lower refractive index as the wavelength in the visible light region is longer. Such a cured product is useful, for example, as a material for producing a low Abbe number diffractive optical element in the multilayer diffractive optical element described later.

The particle size of the indium tin oxide (ITO) particle is preferably 5 nm to 50 nm. By setting the particle size to 50 nm or less, it is possible to prevent deterioration of transmittance due to Rayleigh scattering. In addition, by setting the particle size to 5 nm or more, it is possible to perform a production without technical difficulty. The particle size of the ITO particle can be obtained by averaging particle sizes which are measured by a transmission electron microscopy (TEM). That is, a minor axis and a major axis of one particle in an electron micrograph photographed by TEM are measured, and the average value thereof is determined as a particle size of one particle. In the present specification, particle sizes of 50 or more particles are averaged to obtain an average primary particle size.

It is preferable that the ITO particles are mixed, in a state of being dispersed in a solvent, with the above-described bifunctional or more (meth)acrylate compound and the acidic polymer described later to form the curable resin composition according to the embodiment of the present invention. After mixing, the solvent may or may not be removed by distillation or the like, but it is preferable to be removed.

The dispersibility of the ITO particles in a solvent can be improved by using surface-modified ITO particles. The surface modification of ITO particles is preferably performed with, for example, a monocarboxylic acid having 6 to 20 carbon atoms. It is preferable that the surface modification of ITO particles with a monocarboxylic acid is performed by covalently bonding a carboxyl group derived from the monocarboxylic acid to the ITO particle through an oxygen atom on the surface of the ITO particle, thereby forming an ester bond. Examples of the monocarboxylic acid having 6 to 20 carbon atoms include oleic acid (having 18 carbon atoms), stearic acid (having 18 carbon atoms), palmitic acid (having 16 carbon atoms), myristic acid (having 14 carbon atoms), and decanoic acid (having 10 carbon atoms), and oleic acid (having 18 carbon atoms) is preferable.

In the curable resin composition, a moiety (for example, a group derived from a monocarboxylic acid having 6 to 20 carbon atoms) bonded to the ITO particles by the above-described surface modification may be bonded to the ITO particles as it is, a part thereof may be replaced with a group derived from an acidic polymer, or all may be replaced with groups derived from acidic polymers. In the curable resin composition according to the embodiment of the present invention, it is preferable that both a group derived from a monocarboxylic acid having 6 to 20 carbon atoms and a group derived from an acidic polymer are bonded to the surface of the ITO particles.

As the solvent, a solvent having a constituent (δp) of 0 to 6 MPa$^{(1/2)}$, the constituent being a polarity term in the SP value, is preferable.

The constituent (δp) of polarity term in the SP value is a value calculated by the Hansen solubility parameter. The Hansen solubility parameter is constituted of intermolecular dispersive force energy (δd), intermolecular polar energy (δp), and intermolecular hydrogen bonding energy (δh). In the present specification, the Hansen solubility parameter is a value calculated using HSPiP (version 4.1.07) software.

Specifically, the solvent is preferably toluene (1.4), xylene (1.0), or hexane (0), and more preferably toluene. The value in the parentheses is a value of δp.

A method for producing the ITO particles is not particularly limited, and for example, the ITO particles can be produced according to the procedure described in ACS Nano 2016, 10, pp. 6942 to 6951. According to the procedure of the reference, a dispersion liquid of surface-modified ITO particles is obtained.

Specifically, a solution obtained by mixing a monocarboxylic acid having 6 to 20 carbon atoms, an indium salt (for example, indium acetate), and a tin salt (for example, tin acetate) is added dropwise to an alcohol (long-chain alcohol such as oleyl alcohol) heated to high temperature, and the mixture is retained at high temperature, thereby capable of forming particles. Thereafter, a poor solvent (lower alcohol such as ethanol) having low polymer solubility is added thereto to precipitate the particles, the supernatant is removed, and the particles are redispersed in the above-described solvent such as toluene, thereby capable of forming a dispersion liquid of surface-modified ITO particles.

In the curable resin composition according to the embodiment of the present invention, the content of the ITO particles is preferably 10% by mass to 60% by mass, more preferably 20% by mass to 60% by mass, and still more preferably 30% by mass to 55% by mass with respect to the total mass (solid content mass excluding, in a case of including a solvent, the solvent) of the curable resin composition.

[Acidic Polymer]

The acidic polymer includes a carboxyl group, and functions as a dispersant in the curable resin composition according to the embodiment of the present invention. Specifically the carboxyl group functions as an adsorptive group adsorbed on the ITO particles. The acidic polymer including a carboxyl group has higher compatibility with a (meth)acrylate compound than, for example, a phosphoric acid-based dispersant. Therefore, in a case where a curable resin composition including the acidic polymer is cured, phase separation or whitening hardly occurs. In addition, in a case of forming a diffraction grating shape, adhesiveness between the resin and the mold is good, and asperity of a peeled surface is less likely to occur due to that curing shrinkage is small. Furthermore, the viscosity is less likely to increase as compared with, for example, an amine-based dispersant.

The acidic polymer includes a polymer skeleton of a (meth)acrylate compound. By including the polymer skeleton of a (meth)acrylate compound, compatibility of the acidic polymer in the curable resin composition with a (meth)acrylate compound is better. In addition, it is easy to control the refractive index of the cured product of the curable resin composition.

The polymer skeleton of a (meth)acrylate compound may be a linear skeleton or a branched skeleton, but is preferably a linear skeleton. Specifically, a skeleton in which only a monofunctional (meth)acrylate monomer is polymerized is preferable. Examples of the monofunctional (meth)acrylate monomer include (meth)acrylate monomers described in paragraph 0042 of JP2012-107191A, and methyl (meth) acrylate, ethyl (meth)acrylate, propyl (meth)acrylate, butyl (meth)acrylate, isobutyl (meth)acrylate, isoamyl (meth) acrylate, isooctyl (meth)acrylate, or octyl (meth)acrylate is preferable, and methyl (meth)acrylate or ethyl (meth)acrylate is more preferable. All the monomer units constituting the polymer skeleton of a (meth)acrylate compound may be the same as or different from each other.

The number of monomer units constituting the polymer skeleton of a (meth)acrylate compound is preferably 5 to 50, more preferably 8 to 40, and still more preferably 10 to 30.

In one molecule of the acidic polymer, one polymer skeleton of a (meth)acrylate compound may be included or two or more polymer skeletons of a (meth)acrylate compound may be included. For example, in one molecule of the acidic polymer, 1 to 6 polymer skeletons of a (meth)acrylate compound are preferably included, and 1 to 4 polymer skeletons of a (meth)acrylate compound are more preferably included.

The acidic polymer has a moiety including a carboxyl group at any one of terminals of the above-described polymer skeleton of a (meth)acrylate compound. Since the moiety including a carboxyl group presents at a terminal of the polymer skeleton of a (meth)acrylate compound, the acidic polymer can prevent the viscosity of the curable resin composition from increasing. It is preferable that the carboxyl group presents at terminals of the entire molecular structure of the acidic polymer. The acidic polymer preferably has a moiety including a carboxyl group at only one terminal of the above-described polymer skeleton of a (meth)acrylate compound.

In a case where two or more polymer skeletons of a (meth)acrylate compound are included in one molecule of the acidic polymer, it is preferable to have a moiety including a carboxyl group at any one of terminals of all the polymer skeletons of a (meth)acrylate compound, and it is preferable to have a moiety including a carboxyl group at only one terminal of all the polymer skeletons of a (meth) acrylate compound.

It is more preferable that the acidic polymer includes a carboxyl group only in the above-described moiety. Specifically, it is preferable that the acidic polymer does not have a group including a carboxyl group as a side chain on the polymer skeleton of a (meth)acrylate compound. The reason is that the increase in viscosity of the curable resin composition can be prevented.

The moiety including a carboxyl group may consist of only the carboxyl group or may be a substituent including a carboxyl group. The number of carboxyl groups included in the moiety including a carboxyl group is not particularly limited, but is preferably 1 to 10 and more preferably 2 to 8.

The moiety including a carboxyl group preferably includes one or more of the following partial structures. By having a carboxyl group at a nearby moiety, as in the following partial structures, absorptivity to the ITO particles can be increased. The moiety including a carboxyl group more preferably includes 1 to 4 of the following partial structure represented by Formula 2.

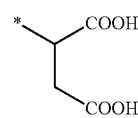

2

(In Formula 2, *Represents a Bonding Position to a Remaining Moiety of the Acidic Polymer)

The acid value of the acidic polymer is 2.0 mgKOH/g or more and less than 100 mgKOH/g, preferably 2.0 mgKOH/g or more and less than 70 mgKOH/g. The acid value refers to the number in mg of potassium hydroxide required to neutralize free fatty acid present in 1 g of the acidic polymer.

By adjusting the molecular weight of the acidic polymer and the number of carboxyl groups such that the acid value of the acidic polymer is within the above-described range, it is possible to achieve both appropriate viscosity and particle dispersion performance. In a case where the acid value of the acidic polymer is 2.0 mgKOH/g or more, the acidic polymer can be sufficiently adsorbed on the ITO particles and the dispersity is improved. In addition, in a case where the acid value of the acidic polymer is less than 100 mgKOH/g, it is possible to prevent too high viscosity due to that the number of carboxyl groups (adsorption moiety) is too large and prevent too low viscosity due to that the molecule is too small.

Preferred examples of the acidic polymer include an acidic polymer having a structure represented by Formula (1).

$$(R^1-S-L^2)_n-L^1-(L^3-A-R^2)_m \quad (1)$$

In Formula (1), $R^1$ represents a substituent including at least one carboxyl group, A represents a polymer skeleton of a (meth)acrylate compound, $R^2$ represents a hydrogen atom or a substituent not including a carboxyl group, $L^1$ represents a single bond or a (m+n)-valent linking group, $L^2$ and $L^3$ each independently represent a single bond or a divalent linking group, m represents an integer of 1 to 8, and n represents an integer of 1 to 9, in which m+n satisfies 2 to 6, each of n $R^1$ and $L^2$ may be the same as or different from each other, and each of m $R^2$, A, $L^3$ may be the same as or different from each other.

Examples of $R^1$ include an alkyl group substituted with a carboxyl group, and an alkyl group having 1 to 10 carbon atoms and substituted with 1 to 4 carboxyl groups is preferable, an alkyl group having 1 to 7 carbon atoms and substituted with 1 to 3 carboxyl groups is more preferable, and an alkyl group having 1 to 5 carbon atoms and substituted with 1 or 2 carboxyl groups is still more preferable. Specific examples of $R^1$ include a group including the partial structure represented by Formula 2 (including a group consisting of the partial structure represented by Formula 2).

$R^2$ is preferably a hydrogen atom.

Examples of $L^1$ include a single bond, a group formed by removing any (m+n) hydrogen atoms in a linear or branched alkane, and the following groups.

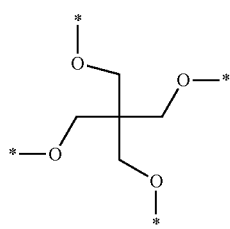

-continued

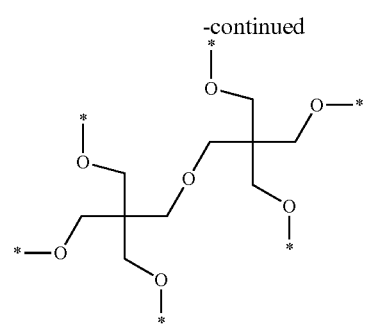

Examples of the divalent linking group represented by $L^2$ or $L^3$ include an alkylene group having 1 to 10 carbon atoms, and a group in which, in an alkylene group having 1 to 10 carbon atoms, any one or two or more non-adjacent —CH$_2$— are substituted with —O—, —S—, —C(=O)—, —OC(=O)—, —C(=O)O—, —OC(=O)O—, —NHC(=O)—, —C(=O)NH—, —OC(=O)NH—, —NHC(=O)O—, —SC(=O)—, or —C(=O)S—.

The weight-average molecular weight of the acidic polymer is preferably 1,000 to 20,000, more preferably 1,000 to 15,000, and still more preferably 1,000 to 7,000. By setting the weight-average molecular weight of the acidic polymer to 1,000 or more, it is possible to suppress bubbles to be mixed in a case of curing the curable resin composition. In addition, by setting the weight-average molecular weight of the acidic polymer to 20,000 or less, the fluidity is less likely to decrease even in a case where an amount necessary for dispersing the ITO particles is added to the curable resin composition, and air gaps are less likely to occur in a level difference even in a case of forming the diffraction grating shape.

Specific examples of the acidic polymer include compounds having the following structures.

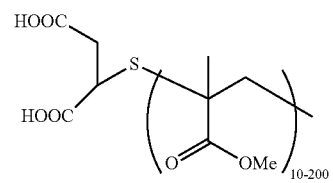

P-1-3

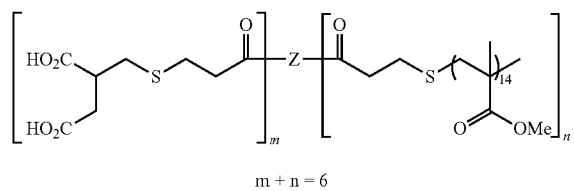

P-5 m + n = 6

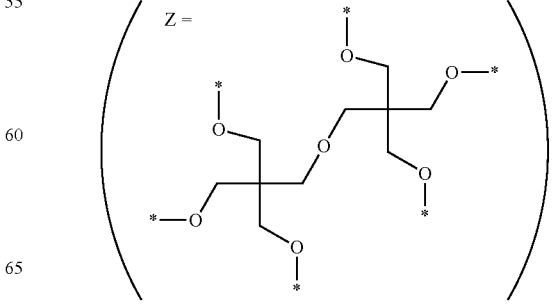

-continued

P-6

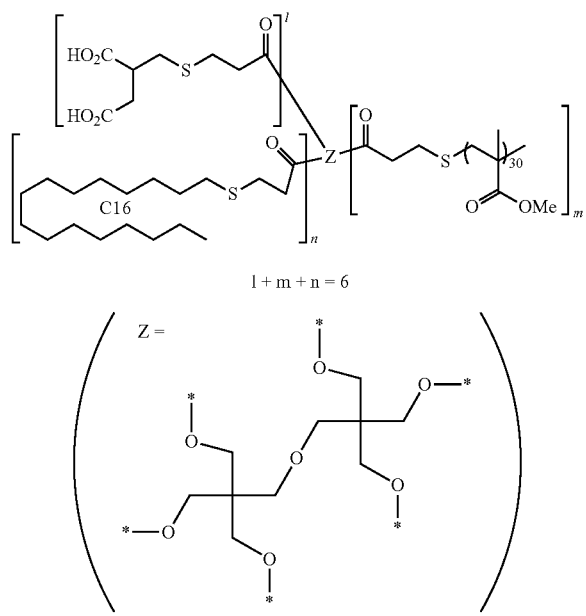

$l + m + n = 6$

In the structural formulae, one terminal of the polymer skeleton of a (meth)acrylate compound is a hydrogen atom.

The acidic polymer can be produced by reacting a (meth) acrylate monomer with a compound having a carboxyl group, which is capable of terminating the polymerization reaction of the monomer. Examples of such compounds include mercaptosuccinic acid, mercaptooxalic acid, and mercaptomalonic acid, and mercaptosuccinic acid is preferable. Furthermore, a structure having a plurality of the polymer skeletons of a (meth)acrylate compound in one molecule can be obtained by adding and reacting a polyol mercapto alkylate or the like.

The content of the acidic polymer in the curable resin composition is preferably 5% by mass to 50% by mass with respect to the total mass of the ITO particles. Within the above-described range, it is possible to suppress bubbles to be mixed while dispersing the ITO particles in the curable resin composition. The value is more preferably 5% by mass to 30% by mass, and still more preferably 5% by mass to 20% by mass.

Two or more kinds of acidic polymers may be contained in the curable resin composition. In a case of containing two or more kinds of acidic polymers, the total content is preferably within the above-described range.

[Photopolymerization Initiator]

The curable resin composition according to the embodiment of the present invention preferably includes a photopolymerization initiator. The photopolymerization initiator is not particularly limited, and examples thereof include 2,4,6-trimethylbenzoyl-diphenyl-phosphine oxide (IRGACURE TPO, manufactured by BASF), bis(2,4,6-trimethylbenzoyl)-phenylphosphine oxide (IRGACURE 819, manufactured by BASF), 2,2-dimethoxy-1,2-diphenylethan-1-one (IRGACURE 651, manufactured by BASF), 1-hydroxy-cyclohexyl-phenyl-ketone (IRGACURE 184, manufactured by BASF), 1-hydroxy-cyclohexyl-phenyl-ketone (IRGACURE 1173, manufactured by BASF), 1-[4-(2-hydroxy-ethoxy)-phenyl]-2-hydroxy-2-methyl-1-propan-1-one (IGACURE 2959, manufactured by BASF), 2-hydroxy-1-{4-[4-(2-hydroxy-2-methyl-propionyl)-benzyl]phenyl}-2-methyl-propan-1-one (IRGACURE 127, manufactured by BASF), and 2-methyl-1-(4-methylthiophenyl)-2-morpholinopropan-1-one (IRGACURE 907, manufactured by BASF).

The content of the photopolymerization initiator is preferably 0.01% to 5.0% by mass, more preferably 0.05% to 1.0% by mass, and still more preferably 0.05% to 0.5% by mass with respect to the total mass of the curable resin composition.

In the production of the curable resin composition including a photopolymerization initiator, the timing of adding the photopolymerization initiator is not particularly limited, but it is preferable that the photopolymerization initiator is added to a composition obtained by distilling off a solvent from a mixed solution obtained by adding the bifunctional or more (meth)acrylate compound and the acidic polymer to the ITO particle dispersion liquid.

[Other Additives and the Like]

The curable resin composition according to the embodiment of the present invention may include additives such as a polymer or a monomer other than the above-described components, a dispersant, a plasticizer, a heat stabilizer, a release agent, or the like as long as the gist of the invention is maintained.

<Viscosity of Curable Resin Composition>

The viscosity of the curable resin composition according to the embodiment of the present invention is preferably 5,000 mPa·s or less, more preferably 3,000 mPa·s or less, still more preferably 2,500 mPa·s or less, and particularly preferably 2,000 mPa·s or less. By setting the viscosity of the curable resin composition within the above-described range, handleability in a case of molding a cured product can be improved, and a cured product having high quality can be formed. The viscosity of the curable resin composition according to the embodiment of the present invention is preferably 50 mPa·s or more, more preferably 100 mPa·s or more, still more preferably 200 mPa·s or more, and particularly preferably 500 mPa·s or more.

<Cured Product of Curable Resin Composition>

A cured product obtained by curing the curable resin composition according to the embodiment of the present invention is transparent, has a low Abbe number (vD), and has a low refractive index (nD).

For example, in a case where the above-described cured product is formed into a sheet having a thickness of 1 μm to 10 μm, it is possible to obtain a transmittance of 80% or more at a wavelength of 400 to 600 nm. The transmittance means a transmittance of light having a wavelength of 400 to 600 nm measured by a spectrophotometer (for example, a spectrophotometer "V-670" manufactured by JASCO Corporation).

In the present specification, the "refractive index (nD)" is a refractive index at a wavelength of 587.56 nm. In addition, the "Abbe number (vD)" is a value calculated from refractive index measurement values at different wavelengths by the following equation.

$$vD=(nD-1)/(nF-nC)$$

Here, nD represents a refractive index at a wavelength of 587.56 nm, nF represents a refractive index at a wavelength of 486.13 nm, and nC represents a refractive index at a wavelength of 656.27 nm.

The Abbe number vD of the cured product obtained by curing the curable resin composition according to the embodiment of the present invention is not particularly limited, but is preferably 30 or less, more preferably 27 or less, still more preferably 25 or less, and particularly preferably 23 or less. In addition, the Abbe number of the above-described cured product is not particularly limited, but is preferably 5 or more, more preferably 10 or more, still more preferably 15 or more, and particularly preferably 17 or more. The Abbe number of the above-described cured product is preferably 15 to 25.

The refractive index nD of the cured product obtained by curing the curable resin composition according to the embodiment of the present invention is preferably 1.40 to 1.57 and more preferably 1.42 to 1.55.

<Use of Curable Resin Composition>

The use of the curable resin composition according to the embodiment of the present invention is not particularly limited. In particular, it is preferable to be used as a material for forming an optical lens, and it is more preferable to be used as a material for producing a diffractive optical element.

[Diffractive Optical Element]

A diffractive optical element formed by curing the curable resin composition according to the embodiment of the present invention preferably has a maximum thickness of 2 μm to 100 The maximum thickness is more preferably 2 to 50 μm and particularly preferably 2 μm to 30 In addition, the level difference of the diffractive optical element is preferably 1 μm to 100 μm and more preferably 1 μm to 50 Furthermore, it is sufficient that the pitch of the diffractive optical element is in a range of 0.1 mm to 10 mm, and it is preferable that the pitch is changed according to the required optical aberration in the same diffractive optical element.

The diffractive optical element can be produced according to, for example, the following procedure.

The curable resin composition is sandwiched between a surface of a mold, which is processed into a diffraction grating shape, and a transparent substrate. Thereafter, the curable resin composition may be pressurized and stretched to a desired range. In the sandwiched state, the curable resin composition is irradiated with light from the transparent substrate side to cure the curable resin composition. Thereafter, the cured product is released from the mold. After the mold release, the cured product may be further irradiated with light from the side opposite to the transparent substrate side.

Examples of the transparent substrate include a flat glass, and a flat transparent resin (such as (meth)acrylic resin, polycarbonate resin, and polyethylene terephthalate).

The transparent substrate used in the above-described production may be included in the diffractive optical element as it is, or may be peeled off.

The surface of the mold, which is processed into a diffraction grating shape, is preferably a chromium nitride-treated surface. As a result, good mold releasability can be obtained, and the producing efficiency of the diffractive optical element can be improved.

Examples of the chromium nitride treatment include a method for forming a chromium nitride film on the mold surface. As the method for forming a chromium nitride film on the mold surface, a chemical vapor deposition (CVD) method and a physical vapor deposition (PVD) method can be exemplified. The CVD method is a method in which a raw material gas including chromium and a raw material gas including nitrogen are reacted at a high temperature to form a chromium nitride film on a surface of a base substance. In addition, the PVD method is a method (arc-type vacuum vapor deposition method) for forming a chromium nitride film on a surface of a base substance using arc discharge. The arc-type vacuum vapor deposition method is a method for forming a film of a compound by reacting ionized metals with a reaction gas on the surface of the base substance. Specifically, a cathode (evaporation source) formed with, for example, chrome in a vacuum container, is disposed, arc discharge occurs between the cathode and a wall surface of the vacuum container through a trigger, ionization of metal by arc plasma is performed at the same time of evaporating the cathode, a negative voltage is applied to the base substance, and a reaction gas (for example, nitrogen gas) is introduced into the vacuum container at approximately several tens mTorr (1.33 Pa).

As the light used for the light irradiation curing the curable resin composition, ultraviolet light or visible light preferable and ultraviolet light is more preferable. For example, a metal halide lamp, a low pressure mercury lamp, a high pressure mercury lamp, an ultra-high pressure mercury lamp, a germicidal lamp, a xenon lamp, a light emitting diode (LED) light source lamp, and the like are suitably used. The illuminance of ultraviolet light used for the light irradiation curing the curable resin composition is preferably 1 to 100 mW/cm$^2$, more preferably 1 to 75 mW/cm$^2$, and still more preferably 5 to 50 mW/cm$^2$. The curable resin composition may be irradiated with ultraviolet light having different illuminance multiple times. The exposure dose of ultraviolet light is preferably 0.4 to 10 J/cm$^2$, more preferably 0.5 to 5 J/cm$^2$, and still more preferably 1 to 3 J/cm$^2$. The atmosphere during the light irradiation is preferably an atmosphere replaced with air or an inert gas, and more preferably an atmosphere in which air is replaced with nitrogen until the oxygen concentration is 1% or less.

[Multilayer Diffractive Optical Element]

A multilayer diffractive optical element may be formed by including, as a first diffractive optical element, the diffractive optical element formed by curing the curable resin composition according to the embodiment of the present invention, and further overlapping a second diffractive optical element formed of a different material such that the first diffractive optical element and the second diffractive optical element face each other in lattice-shaped surfaces. In this case, it is preferable that the lattice-shaped surfaces are in contact with each other.

By forming the second diffractive optical element with a material having a higher refractive index and higher Abbe number than the first diffractive optical element, it is possible to suppress the occurrence of flare, and the like, and sufficiently utilize a chromatic aberration reducing effect of the multilayer diffractive optical element.

The Abbe number vD of the second diffractive optical element is not particularly limited, but is preferably more than 30, more preferably 35 or more, and still more preferably 40 or more. In addition, the Abbe number of the second diffractive optical element is not particularly limited, but is preferably 70 or less, more preferably 60 or less, and still more preferably 50 or less.

The refractive index nD of the second diffractive optical element is preferably 1.55 to 1.70 and more preferably 1.56 to 1.65. In addition, the refractive index nD of the second diffractive optical element is set to be larger than the refractive index nD of the first diffractive optical element used simultaneously in the multilayer diffractive optical element.

The material for forming the second diffractive optical element is not particularly limited as long as a cured product having a high refractive index and a high Abbe number is obtained. For example, a resin composition including a (meth)acrylate monomer having a sulfur atom, a halogen atom, an aromatic structure, a resin composition including zirconium oxide and a (meth)acrylate monomer, and the like can be used.

The multilayer diffractive optical element can be produced according to, for example, the following procedure.

A material for forming a second diffractive optical element is sandwiched between a diffraction grating shape surface (surface obtained after the mold release) of a diffractive optical element formed by curing the curable resin composition according to the embodiment of the present invention, and a transparent substrate. Thereafter, the material may be pressurized and stretched to a desired range. In the sandwiched state, the material is irradiated with light from the transparent substrate side to cure the material. Thereafter, the cured product is released from the mold.

Examples of the transparent substrate include the same examples as the transparent substrate used in a case of producing the diffractive optical element (first diffractive optical element).

The transparent substrate used in the above-described production may be included in the multilayer diffractive optical element as it is, or may be peeled off.

The multilayer diffractive optical element preferably has a maximum thickness of 50 μm to 20 mm. The maximum thickness is more preferably 50 μm to 10 mm and particularly preferably 50 μm to 3 mm.

[Lens]

The above-described diffractive optical element and multilayer diffractive optical element can be used as a lens, respectively.

A film or a member can be provided on the surface or the periphery of the lens depending on the environment in which the lens is used or the use of the lens. For example, a protective film, an anti-reflection film, a hard coat film, and the like can be formed on the surface of the lens. In addition, the lens can be used as a composite lens in which a glass lens or a plastic lens is laminated on the lens. Furthermore, the periphery of the lens can be fitted into a base material holding frame or the like, and fixed. However, these films, frames, and the like are members added to the lens, and are distinguished from the lens itself in the present specification.

The lens is preferably used as an image pick-up lens in a mobile phone, a digital camera, and the like, an imaging lens in a television, a video camera, and the like, and an in-vehicle lens.

EXAMPLES

Features of the present invention will be described in more detail with reference to Examples and Comparative Examples. The materials, amounts used, proportions, treatment details, treatment procedures, and the like described in the following examples can be appropriately modified as long as the gist of the invention is maintained. Therefore, the scope of the present invention should not be construed as being limited to the following specific examples.

Example 1

(Synthesis of ITO Particles (ITO-1))

75 ml of oleic acid (manufactured by Sigma-Aldrich, Inc., technical grade, 90%), 10.060 g (34.5 mmol) of indium acetate (manufactured by Alfa Aesar, 99.99%), and 1.079 g (3.0 mmol) of tin (IV) acetate (manufactured by Alfa Aesar) were added in a flask. The mixture in the flask was heated at 160° C. for 1 hour under an environment of nitrogen flow to obtain a yellow transparent precursor solution.

Subsequently, 90 ml of oleyl alcohol (manufactured by FUJIFILM Wako Pure Chemical Corporation, 65% or more) in another flask was heated to 290° in a nitrogen flow. Using a syringe pump, the precursor solution was added dropwise to the heated oleyl alcohol at a rate of 1.75 mL/min. After the completion of the dropwise addition of the precursor solution, the obtained reaction solution was retained at 290° C. for 120 minutes, and thereafter, the heating was stopped and the reaction solution was cooled to room temperature.

After adding ethanol to the obtained reaction solution, centrifugation was performed to precipitate particles. The removal of the supernatant and the redispersion of the particles in toluene were repeated 3 times to obtain a toluene dispersion liquid (ITO solid content: 4.75% by mass, surface-modified component solid content: 0.25% by mass) of ITO particles (ITO-1) coordinated with oleic acid.

In a case where the ITO particles (ITO-1) were observed with TEM, the average particle size was 21 nm.

(Synthesis of Carboxylic Acid Polymer (P-1))

24.0 g of methyl methacrylate (manufactured by Wako Pure Chemical Corporation) and 1.80 g of mercaptosuccinic acid (manufactured by Wako Pure Chemical Corporation) were dissolved in 28 mL of methyl ethyl ketone and heated to 70° C. under a nitrogen stream. The solution was added dropwise over 30 minutes to a solution in which 0.24 g of a polymerization initiator (V-65, manufactured by Wako Pure Chemical Corporation) was dissolved in 12 mL of methyl ethyl ketone. After the completion of the dropwise addition, the reaction was further performed at 70° C. for 4.5 hours. After allowing to cool, the reaction solution was added dropwise to a cooled mixed solution of 200 mL of water and 600 mL of methanol, and the precipitated powdery substance was collected by filtration and dried to obtain 15 g of a carboxylic acid polymer (P-1). The weight-average molecular weight of the obtained polymer was 5900 in terms of standard polystyrene according to a gel permeation chromatography (GPC) method, and the dispersity (Mw/Mn) was 1.70. In addition, in a case where the number in mg of potassium hydroxide required to neutralize free fatty acid present in 1 g of the obtained polymer was measured to obtain an acid value, the acid value was 24.

(Preparation of Curable Resin Composition 1-1)

1.25 g of the carboxylic acid polymer (P-1) and 4.3 g of 1,6-hexanediol dimethacrylate (manufactured by Tokyo Chemical Industry Co., Ltd.) were added to 88.4 g of the toluene dispersion liquid of ITO-1 and dissolved. Toluene was distilled off by suction under reduced pressure while heating in a water bath at approximately 70° C. After the distillation, 0.022 g of IRGACURE 651 (manufactured by BASF) was added to the obtained mixture and dissolved, thereby obtaining a curable resin composition 1-1.

Example 2

(Synthesis of Carboxylic Acid Polymer (P-2))

A polymer (P-2) was synthesized in the same manner as the carboxylic acid polymer (P-1), except that the amount of mercaptosuccinic acid was changed to 1.30 g. The weight-average molecular weight of the obtained polymer was 7,200 in terms of standard polystyrene according to the GPC method, and the dispersity (Mw/Mn) was 1.45. In addition, in a case where the number in mg of potassium hydroxide required to neutralize free fatty acid present in 1 g of the obtained polymer was measured to obtain an acid value, the acid value was 14.

(Preparation of Curable Resin Composition 1-2)

0.99 g of the carboxylic acid polymer (P-2) and 4.56 g of 1,6-hexanediol dimethacrylate (manufactured by Tokyo Chemical Industry Co., Ltd.) were added to 88.4 g of the toluene dispersion liquid of ITO-1 and dissolved. Toluene was distilled off by suction under reduced pressure while heating in a water bath at approximately 70° C. After the distillation, 0.022 g of IRGACURE 651 (manufactured by BASF) was added to the obtained mixture and dissolved, thereby obtaining a curable resin composition 1-2.

Example 3

(Synthesis of Carboxylic Acid Polymer (P-3))

A polymer (P-3) was synthesized in the same manner as the carboxylic acid polymer (P-1), except that the amount of mercaptosuccinic acid was changed to 0.36 g. The weight-average molecular weight of the obtained polymer was 16800 in terms of standard polystyrene according to the GPC method, and the dispersity (Mw/Mn) was 1.53. In addition, in a case where the number in mg of potassium hydroxide required to neutralize free fatty acid present in 1 g of the obtained polymer was measured to obtain an acid value, the acid value was 5.

(Preparation of Curable Resin Composition 1-3)

0.39 g of the carboxylic acid polymer (P-3) and 5.16 g of 1,6-hexanediol dimethacrylate (manufactured by Tokyo Chemical Industry Co., Ltd.) were added to 88.4 g of the toluene dispersion liquid of ITO-1 and dissolved. Toluene was distilled off by suction under reduced pressure while heating in a water bath at approximately 70° C. After the distillation, 0.022 g of IRGACURE 651 (manufactured by BASF) was added to the obtained mixture and dissolved, thereby obtaining a curable resin composition 1-3.

Example 4

(Preparation of Curable Resin Composition 1-4)

A curable resin composition 1-4 was produced in the same manner as the curable resin composition 1-1, except that 1,6-hexanediol dimethacrylate of the curable resin composition 1-1 was changed to 1,6-hexanediol diacrylate (manufactured by Tokyo Chemical Industry Co., Ltd.).

Example 5

(Preparation of Curable Resin Composition 1-5)

A curable resin composition 1-5 was produced in the same manner as the curable resin composition 1-1, except that 1,6-hexanediol dimethacrylate of the curable resin composition 1-1 was changed to a mixture of 2.6 g of 1,6-hexanediol dimethacrylate and 1.7 g of 1,9-nonanediol dimethacrylate (NOD-N, manufactured by Shin-Nakamura Chemical Co., Ltd.).

Example 6

(Preparation of Curable Resin Composition 1-6)

A curable resin composition 1-6 was produced in the same manner as the curable resin composition 1-1, except that 1,6-hexanediol dimethacrylate of the curable resin composition 1-1 was changed to a mixture of 2.6 g of 1,6-hexanediol dimethacrylate and 1.7 g of 1,9-nonanediol diacrylate (A-NOD-N, manufactured by Shin-Nakamura Chemical Co., Ltd.).

Example 7

(Preparation of Curable Resin Composition 1-7)

A curable resin composition 1-7 was produced in the same manner as the curable resin composition 1-1, except that 1,6-hexanediol dimethacrylate of the curable resin composition 1-1 was changed to a mixture of 2.6 g of 1,6-hexanediol dimethacrylate and 1.7 g of 1,10-decanediol dimethacrylate (DOD-N, manufactured by Shin-Nakamura Chemical Co., Ltd.).

Example 8

(Preparation of Curable Resin Composition 1-8)

A curable resin composition 1-8 was produced in the same manner as the curable resin composition 1-1, except that 1,6-hexanediol dimethacrylate of the curable resin composition 1-1 was changed to a mixture of 2.6 g of 1,6-hexanediol dimethacrylate and 1.7 g of 1,10-decanediol diacrylate (A-DOD-N, manufactured by Shin-Nakamura Chemical Co., Ltd.).

Example 9

(Synthesis of Carboxylic Acid Polymer (P-5))

23.0 g (29.4 mmol) of dipentaerythritol hexakis(3-mercaptopropionate) [DPMP, manufactured by SAKAI CHEMICAL INDUSTRY CO., LTD.], 3.82 g (29.4 mmol) of itaconic acid, and 100.5 g of propylene glycol monomethyl ether were added in a 300 mL three-neck flask equipped with a cooling pipe, a nitrogen introduction pipe, and a stirring bar. The mixture in the flask was heated to 90° C. To the mixture after heating, 0.17 g of dimethyl 2,2'-azobisisobutyrate [V-601, manufactured by Wako Pure Chemical Corporation] was added and stirred for 2 hours, and then 0.05 g of dimethyl 2,2'-azobisisobutyrate was added and further stirred for 4 hours. Next, 44.2 g (441 mmol) of methyl methacrylate and 0.02 g of dimethyl 2,2'-azobisisobutyrate were added thereto and stirred for 2 hours, and 0.01 g of dimethyl 2,2'-azobisisobutyrate was added thereto and further stirred for 4 hours. After allowing to cool, the reaction solution was added dropwise to a cooled mixed solution of 200 mL of water and 600 mL of methanol, and the precipitated powdery substance was collected by filtration and dried to obtain 10 g of a compound P-5. The weight-average molecular weight of the obtained polymer was 7,100 according to GPC, and the dispersity (Mw/Mn) was 2.20. In addition, in a case where the number in mg of potassium hydroxide required to neutralize free fatty acid present in 1 g of the obtained polymer was measured to obtain an acid value, the acid value was 49.

(Preparation of curable resin composition 1-9)

A curable resin composition 1-9 was produced in the same manner as the curable resin composition 1-1, except that the carboxylic acid polymer (P-1) of the curable resin composition 1-1 was changed to 0.89 g of the carboxylic acid polymer (P-5) and the amount of 1,6-hexanediol dimethacrylate was changed to 4.66 g.

Example 10

(Synthesis of carboxylic acid polymer (P-6)) A carboxylic acid polymer (P-6) was synthesized in the same manner as the carboxylic acid polymer (P-5), except that itaconic acid of the carboxylic acid polymer (P-5) was changed to 3.05 g (23.5 mmol) of itaconic acid and 1.66 g (5.88 mmol) of vinyl palmitate (manufactured by Tokyo Chemical Industry Co., Ltd.). The weight-average molecular weight of the obtained polymer was 6,900 according to GPC, and the dispersity (Mw/Mn) was 2.00. In addition, in a case where the number in mg of potassium hydroxide required to neutralize free fatty acid present in 1 g of the obtained polymer was measured to obtain an acid value, the acid value was 50.

(Preparation of curable resin composition 1-10)

A curable resin composition 1-10 was produced in the same manner as the curable resin composition 1-1, except that the carboxylic acid polymer (P-1) of the curable resin composition 1-1 was changed to 1.19 g of the carboxylic acid polymer (P-6) and the amount of 1,6-hexanediol dimethacrylate was changed to 4.36 g.

Example 11

(Synthesis of ITO Particles (ITO-2))

300 mL of oleic acid (manufactured by Sigma-Aldrich, Inc., technical grade, 90%), 40.241 g (137.8 mmol) of indium acetate (manufactured by Alfa Aesar, 99.99%), and 4.317 g (12.2 mmol) of tin (IV) acetate (manufactured by Alfa Aesar) were added in a flask. The mixture in the flask was heated at 160° C. for 2 hours under an environment of nitrogen flow to obtain a yellow transparent precursor solution.

Subsequently, 90 mL of oleyl alcohol (manufactured by FUJIFILM Wako Pure Chemical Corporation, 65% or more) in another flask was heated to 290° in a nitrogen flow. Using a syringe pump, 75 mL of the precursor solution was added dropwise to the heated oleyl alcohol at a rate of 0.35 mL/min. After adding dropwise 75 mL of the precursor solution, 90 mL of oleyl alcohol was added dropwise thereto at a rate of 1.75 mL/min. After the dropwise addition of oleyl alcohol, a step of adding dropwise 75 mL of the precursor solution again was repeated 3 times.

After the completion of the dropwise addition of the precursor solution, the obtained reaction solution was retained at 290° C. for 120 minutes. Thereafter, the heating was stopped and the reaction solution was cooled to room temperature.

After subjecting the obtained reaction solution to centrifugation by adding ethanol so as to precipitate particles, a treatment of removing the supernatant and redispersing the particles in toluene was repeated 3 times to obtain a toluene dispersion liquid of ITO particles coordinated with oleic acid.

In a case where the ITO particles were observed with TEM, the average particle size was 51 nm.

(Preparation of Curable Resin Composition 1-11)

A curable resin composition 1-11 was produced in the same manner as the curable resin composition 1-1, except that the ITO particles (ITO-1) of the curable resin composition 1-1 were changed to the ITO particles (ITO-2).

Comparative Example 1

(Preparation of Curable Resin Composition 1-1X)

A curable resin composition 1-1X was produced in the same manner as the curable resin composition 1-1, except that the carboxylic acid polymer (P-1) of the curable resin composition 1-1 was changed to 1.49 g of CYCLOMER P ACA 200M (manufactured by Daicel-UCB Co., Ltd.; weight-average molecular weight: 10,000, acid value: 105, active component: 49%) (dispersant used in Examples of JP2008-308593A) and the amount of 1,6-hexanediol dimethacrylate was changed to 4.82 g. However, in a case where CYCLOMER P was added to the ITO and toluene solution, ITO aggregated and precipitated.

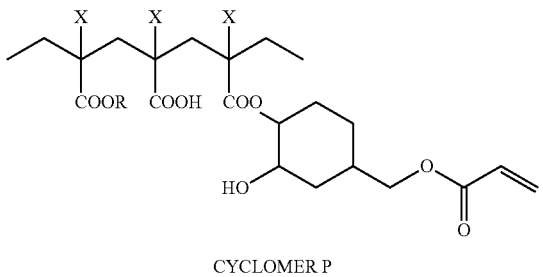

CYCLOMER P

X: methyl group or hydrogen atom.
R: alkyl group, hydroxyalkyl group, and the like Comparative Example 2

(Preparation of Curable Resin Composition 1-2X)

A curable resin composition 1-2X was produced in the same manner as the curable resin composition 1-1, except that the carboxylic acid polymer (P-1) of the curable resin composition 1-1 was changed to 1.12 g of BYK-P104 (manufactured by BYK Japan KK; acid value: 180, active component: 50%) and the amount of 1,6-hexanediol dimethacrylate was changed to 4.99 g.

Comparative Example 3

(Preparation of Curable Resin Composition 1-3X)

A curable resin composition 1-3X was produced in the same manner as the curable resin composition 1-1, except that the carboxylic acid polymer (P-1) of the curable resin composition 1-1 was changed to 3.97 g of DISPERBYK-161 (manufactured by BYK Japan KK; active component: 30%) and the amount of 1,6-hexanediol dimethacrylate was changed to 4.36 g.

Comparative Example 4

(Preparation of Curable Resin Composition 1-4X)

A curable resin composition 1-4X was produced in the same manner as the curable resin composition 1-1, except that the carboxylic acid polymer (P-1) of the curable resin composition 1-1 was changed to 0.83 g of DISPERBYK-111 (manufactured by BYK Japan KK; active component: 100%) and the amount of 1,6-hexanediol dimethacrylate was changed to 4.72 g.

Comparative Example 5

(Preparation of Curable Resin Composition 1-5X)

A curable resin composition 1-5X was produced in the same manner as the curable resin composition 1-1, except that the carboxylic acid polymer (P-1) of the curable resin composition 1-1 was changed to 0.83 g of DISPERBYK-111 (manufactured by BYK Japan KK; active component: 100%) and 1,6-hexanediol dimethacrylate of the curable resin composition 1-1 was changed to a mixture of 3.42 g of 1,6-hexanediol dimethacrylate and 1.3 g of AA-6 (manufactured by TOAGOSEI CO., LTD.).

AA-6

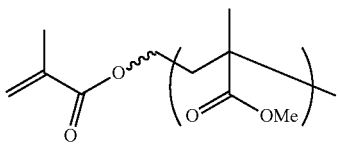

Preparation of Curable Resin Composition 2

20.9 g of FA-512AS (manufactured by Hitachi Chemical Co., Ltd.) and 1.1 g of A9300-1CL (manufactured by Shin-Nakamura Chemical Co., Ltd.) were added to 50 g of SZR-K (manufactured by SAKAI CHEMICAL INDUSTRY CO., LTD.) and stirred until uniform. Methanol and methyl ethyl ketone (MEK) were distilled off by suction under reduced pressure while heating in a water bath at approximately 70° C. After the distillation, 0.40 g of IRGACURE 651 (manufactured by BASF) was added to the obtained mixture and dissolved, thereby producing a curable resin composition 2. The optical characteristics of the curable resin composition 2 were (nD=1.589, vD=46).

Production of Diffractive Optical Element

The curable resin composition 1-1 (1) produced in Example 1 was supplied to a mold (5) processed into a diffraction grating shape as shown in FIG. 1, a flat glass (BK-7) (6) was placed thereon (FIG. 2(a)), and the resin was pressurized and stretched to a desired range. Using a UV irradiation device (EXECURE 3000, manufactured by HOYA CANDEO OPTRONICS CORPORATION), UV irradiation (FIG. 2(b), 7) was performed with an exposure dose of 1.0 J/cm² (30 mW/cm²). The integrated cured product was released from the mold, and UV irradiation (7) was performed again from the resin side with an exposure dose of 1.0 J/cm² (5 mW/cm²) to produce a diffractive optical element 2-1 (2) (FIG. 2(c)).

Production of Multilayer Diffractive Optical Element

The curable resin composition 2 (4) was supplied to the diffractive optical element 2-1, a flat glass (BK-7) (6) was placed thereon (FIG. 2(d)), and the resin was pressurized and stretched to a desired range. Using the above-described UV irradiation device, UV irradiation (FIG. 2(e), 7) was performed with an exposure dose of 1.0 J/cm² (5 mW/cm²) to produce a multilayer diffractive optical element 2-2 (3) (FIG. 2(f)).

Calculation of Diffraction Efficiency

The refractive index and Abbe number of the cured product (diffractive optical element 2-1) of the curable resin composition 1-1 and the cured product of the curable resin composition 2, which are used to produce the multilayer diffractive optical element, are shown in the table. The diffraction efficiency of the first-order light at wavelengths of 589 nm, 486 nm, and 656 nm was calculated with reference to Equations 23 and 24 described in JP2008-241734A. The diffraction efficiency was respectively 100%, 99.5%, and 99.9%. It can be said that the diffraction efficiency is good in a case of being 99% or more.

TABLE 1

|  | Optical material 1-1 | Optical material 2 |
| --- | --- | --- |
| nD | 1.5325 | 1.5892 |
| nF | 1.5492 | 1.5981 |

TABLE 1-continued

|  | Optical material 1-1 | Optical material 2 |
| --- | --- | --- |
| nC | 1.5228 | 1.5855 |
| vD | 20.2 | 46.5 |

Evaluation of Curable Resin Composition

With regard to the curable resin compositions obtained in Examples and Comparative Examples, the following evaluations of transparency, bubbles to be mixed, and mold transferability were performed. The results are shown in Table 2.

(Transparency)

The curable resin composition was sandwiched between hydrophobically treated glass plates, irradiated with UV of an exposure dose of 1.0 J/cm² (30 mW/cm²) using a UV irradiation device (EXECURE 3000, manufactured by HOYA CANDEO OPTRONICS CORPORATION), and irradiated again with UV of an exposure dose of 1.0 J/cm² (5 mW/cm²) to produce a cured product. The thickness of the single film was 10 The transmittance at a wavelength of 400 nm to 600 nm was measured and evaluated according to the following criteria. B or more is practical.

A: transmittance was 90% or more.
B: transmittance was 85% or more and less than 90%.
C: transmittance was less than 85%.

(Bubbles to be Mixed)

The curable resin composition was supplied to a mold processed into a diffraction grating shape as shown in the drawing, a flat glass (BK-7) was placed thereon, the resin was pressurized and stretched to a desired range, and using the above-described UV irradiation device, UV irradiation was performed with an exposure dose of 1.0 J/cm². The number of bubbles included in the cured product was measured using an optical microscope and evaluated according to the following criteria. A or B is practical.

A: the number of bubbles having a diameter of 100 μm or more was 0 or more and less than 5, and the number of bubbles having a diameter of 200 μm or more was 0.
B: the number of bubbles having a diameter of 100 μm or more was 5 or more and less than 20, and the number of bubbles having a diameter of 200 μm or more was 0.
C: the number of bubbles having a diameter of 100 μm or more was 20 or more and less than 100, and the number of bubbles having a diameter of 200 μm or more was 0.
D: the number of bubbles having a diameter of 200 μm or more was 1 or more, or the number of bubbles having a diameter of 100 μm or more was 100 or more.

(Mold Transferability)

The cured product integrated with the above-described glass was released from the mold, and UV irradiation was performed again from the resin side with an exposure dose of 1.0 J/cm² (5 mW/cm²). The surface roughness Ra of the cured product was measured using a noncontact three-dimensional surface shape measuring apparatus (NewView 5022, manufactured by Zygo Corporation; measuring condition: 10× Mirau objective lens was used and zoom lens was not used, measuring area: 0.7 mm×0.53 mm, analysis condition: 4th order was removed) and evaluated according to the following criteria. A or B is practical.

A: less than 10 nm
B: 10 nm or more and less than 20 nm
C: 20 nm or more and less than 100 nm
D: 100 nm or more

TABLE 2

|  |  | Example 1 | Example 2 | Example 3 | Example 4 | Example 5 | Example 6 | Example 7 | Example 8 | Example 9 |
|---|---|---|---|---|---|---|---|---|---|---|
|  | Curable resin composition | 1-1 | 1-2 | 1-3 | 1-4 | 1-5 | 1-6 | 1-7 | 1-8 | 1-9 |
| Particles | ITO | ITO-1 | ITO-1 | ITO-1 | ITO-1 | ITO-1 | ITO-1 | ITO-1 | ITO-1 | ITO-1 |
|  | Particle size | 21 | 21 | 21 | 21 | 21 | 21 | 21 | 21 | 21 |
|  | Parts by mass | 42 | 42 | 42 | 42 | 42 | 42 | 42 | 42 | 42 |
|  | Parts by mass of surface-modified component | 2.2 | 2.2 | 2.2 | 2.2 | 2.2 | 2.2 | 2.2 | 2.2 | 2.2 |
| Dispersant | Carboxylic acid polymer | P-1 | P-2 | P-3 | P-1 | P-1 | P-1 | P-1 | P-1 | P-5 |
|  | Other dispersant | — | — | — | — | — | — | — | — | — |
|  | Acid value | 24 | 14 | 5 | 24 | 24 | 24 | 24 | 24 | 49 |
|  | Position of carboxylic acid | Terminal | Terminal | Terminal | Terminal | Terminal | Terminal | Terminal | Terminal | Terminal |
|  | Mw | 5900 | 7200 | 16800 | 5900 | 5900 | 5900 | 5900 | 5900 | 7100 |
|  | Parts by mass | 12.5 | 9.9 | 3.9 | 12.5 | 12.5 | 12.5 | 12.5 | 12.5 | 8.9 |
|  | D/P | 0.30 | 0.24 | 0.09 | 0.32 | 0.32 | 0.32 | 0.32 | 0.32 | 0.21 |
| Monomer | Monomer | HDDMA | HDDMA | HDDMA | HDDA | HDDMA | HDDMA | HDDMA | HDDMA | HDDMA |
|  | Parts by mass | 43 | 45.6 | 51.6 | 43 | 26.0 | 26.0 | 26.0 | 26.0 | 46.6 |
|  | Monomer |  |  |  |  | NDDMA | NDDA | DDDMA | DDDA |  |
|  | Parts by mass |  |  |  |  | 17.0 | 17.0 | 17.0 | 17.0 |  |
| Other | Non-adsorbing polymer |  |  |  |  |  |  |  |  |  |
|  | Parts by mass |  |  |  |  |  |  |  |  |  |
| Photopolymerization initiator | IRGACURE 651 | 0.3 | 0.3 | 0.3 | 0.3 | 0.3 | 0.3 | 0.3 | 0.3 | 0.3 |
| Transparency (%) |  | A (94) | A (93) | B (89) | A (94) | A (91) | A (91) | A (91) | A (91) | A (93) |
| Number of bubbles to be mixed |  | A | B | B | A | A | A | A | A | B |
| Ra (nm) |  | A (2) | A (3) | A (6) | B (17) | A (1) | B (12) | A (1) | B (11) | A (5) |

|  |  | Example 10 | Example 11 | Comparative Example 1 | Comparative Example 2 | Comparative Example 3 | Comparative Example 4 | Comparative Example 5 |
|---|---|---|---|---|---|---|---|---|
|  | Curable resin composition | 1-10 | 1-11 | 1-1X | 1-2X | 1-3X | 1-4X | 1-5X |
| Particles | ITO | ITO-1 | ITO-2 | ITO-1 | ITO-1 | ITO-1 | ITO-1 | ITO-1 |
|  | Particle size | 21 | 60 | 21 | 21 | 21 | 21 | 21 |
|  | Parts by mass | 42 | 42 | 42 | 42 | 42 | 42. | 42 |
|  | Parts by mass of surface-modified component | 2.2 | 2.2 | 2.2 | 2.2 | 2.2 | 2.2 | 2.2 |
| Dispersant | Carboxylic acid polymer | P-6 | P-1 | CYCLOMER PACA 200M | BYK-P104 | — | — | — |
|  | Other dispersant | — | — | — | — | DISPERBYK-161 | DISPERBYK-111 | DISPERBYK-111 |
|  | Acid value | 50 | 24 | 105 | 180 | — | 129 | 129 |
|  | Position of carboxylic acid | Terminal | Terminal | Side chain | Side chain |  |  |  |
|  | Mw | 6900 | 5900 | 10000 | — | — | — | — |
|  | Parts by mass | 11.9 | 12.5 | 7.3 | 5.6 | 11.9 | 8.3 | 8.3 |
|  | D/P | 0.28 | 0.30 | 0.17 | 0.13 | 0.28 | 0.20 | 0.20 |

TABLE 2-continued

| Monomer | Monomer | HDDMA | HDDMA | HDDMA | HDDMA | HDDMA | HDDMA | HDDMA |
|---|---|---|---|---|---|---|---|---|
| | Parts by mass | 43.6 | 43 | 48.2 | 49.9 | 43.6 | 47.2 | 34.2 |
| | Monomer | | | | | | | |
| | Parts by mass | | | | | | | |
| Other | Non-adsorbing polymer | | | | | | | AA-6 (Mw11k) |
| | Parts by mass | | | | | | | 13 |
| Photopoly-merization initiator | IRGACURE 651 | 0.3 | 0.3 | 0.3 | 0.3 | 0.3 | 0.3 | 0.3 |
| Transparency (%) | | A (92) | B (86) | Precip-itating ITO in a case of adding CYCLOMER | A (90) | B (88) | B (86) | C (80) |
| Number of bubbles to be mixed | | B | A | | C | C | D | B |
| Ra (nm) | | A (4) | A (2) | | A (5) | A (4) | C (48). | C (35) |

In the table, "D/P" is a value dividing the total mass of the particles by the total mass of the acidic polymer.

EXPLANATION OF REFERENCES

1: curable resin composition 1-1
2: diffractive optical element 2-1
3: multilayer diffractive optical element 2-2
4: curable resin composition 2
5: mold
6: flat glass
7: UV irradiation

What is claimed is:

1. A curable resin composition comprising:
   a bifunctional or more (meth)acrylate compound;
   indium tin oxide particles; and
   an acidic polymer,
   wherein the acidic polymer has a moiety including a carboxyl group at a polymer skeleton of a (meth)acrylate compound and at any one of terminals of the polymer skeleton of a (meth)acrylate compound,
   the acid value of the acidic polymer is 2.0 mgKOH/g or more and less than 100 mgKOH/g, and
   the acidic polymer is represented by Formula (1),

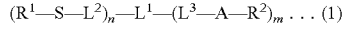

$(R^1-S-L^2)_n-L^1-(L^3-A-R^2)_m \ldots (1)$ wherein in Formula (1), $R^1$ represents a substituent including at least one carboxyl group, A represents a polymer skeleton of a (meth)acrylate compound, $R^2$ represents a hydrogen atom or a substituent not including a carboxyl group, $L^1$ represents a single bond or a (m+n)-valent linking group, $L^2$ and $L^3$ each independently represents a single bond or a divalent linking group, m represents an integer of 1 to 8, and n represents an integer of 1 to 9, in which m+n satisfies 2 to 6, each of n, $R^1$, and $L^2$ may be the same as or different from each other, and each of m, $R^2$, A, and $L^3$ may be the same as or different from each other.

2. The curable resin composition according to claim 1, wherein the moiety of the acidic polymer includes the following partial structure,

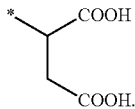 [SMILES: *C(CC(=O)O)C(=O)O]

3. The curable resin composition according to claim 1, wherein the weight-average molecular weight of the acidic polymer is 1,000 to 20,000.

4. The curable resin composition according to claim 1, wherein the content of the acidic polymer is 5% by mass to 50% by mass with respect to the total mass of the indium tin oxide particles.

5. The curable resin composition according to claim 1, wherein the content of the indium tin oxide particles is 10% by mass to 60% by mass with respect to the total mass of the curable resin composition.

6. The curable resin composition according to claim 1, wherein the particle size of the indium tin oxide particles is 5 nm to 50 nm.

7. The curable resin composition according to claim 1, further comprising:
   a photopolymerization initiator.

8. A method for producing the curable resin composition according to claim 1, the method comprising:
   a step of preparing a dispersion liquid in which the indium tin oxide particles are dispersed in a solvent having a constituent (δp) 0 to 6 MPa$^{(1/2)}$, the constituent being a polarity term in an SP value;
   a step of obtaining a mixed solution by mixing the dispersion liquid with the bifunctional or more (meth)acrylate compound and the acidic polymer; and
   a step of distilling off the solvent from the mixed solution.

9. The producing method according to claim 8, wherein the solvent is selected from the group consisting of toluene, xylene, and hexane.

10. The producing method according to claim 8, wherein the solvent is toluene.

11. The producing method according to claim 8, wherein the indium tin oxide particles in the dispersion liquid are surface-modified with a monocarboxylic acid having 6 to 20 carbon atoms.

12. The producing method according to claim 11, wherein the monocarboxylic acid is oleic acid.

13. The producing method according to claim 8, further comprising:
    a step of further mixing a photopolymerization initiator to a mixture obtained after the distillation.

14. A cured product of the curable resin composition according to claim 1,
    wherein the refractive index at a wavelength of 587.56 nm is 1.40 to 1.57, and the Abbe number is 15 to 25.

15. A diffractive optical element comprising:
    the cured product according to claim 14,
    wherein the diffractive optical element includes a surface having a diffraction grating shape and formed of the cured product.

16. A multilayer diffractive optical element comprising:
a first diffractive optical element; and
a second diffractive optical element,
wherein the first diffractive optical element is the diffractive optical element according to claim 15, and
the surface of the first diffractive optical element, which has a diffraction grating shape, and a surface of the second diffractive optical element, which has a diffraction grating shape, face each other.

17. The multilayer diffractive optical element according to claim 16,
wherein the refractive index of the second diffractive optical element at a wavelength of 587.56 nm is 1.55 to 1.70, and is larger than the refractive index of the first diffractive optical element at the wavelength of 587.56 nm, and
the Abbe number of the second diffractive optical element is 35 to 60.

18. The multilayer diffractive optical element according to claim 16,
wherein the surface of the first diffractive optical element, which has a diffraction grating shape, and the surface of the second diffractive optical element, which has a diffraction grating shape, are in contact with each other.

19. The multilayer diffractive optical element according to claim 16, further comprising:
a transparent substrate,
wherein the first diffractive optical element, the second diffractive optical element, and the transparent substrate are arranged in this order.

* * * * *